US008825123B1

(12) United States Patent
Gudino

(10) Patent No.: US 8,825,123 B1
(45) Date of Patent: Sep. 2, 2014

(54) PASSTHROUGH CASE FOR A SMART PHONE

(71) Applicant: Juan Carlos Gudino, Weston, FL (US)

(72) Inventor: Juan Carlos Gudino, Weston, FL (US)

( * ) Notice: Subject to any disclaimer, the term of this patent is extended or adjusted under 35 U.S.C. 154(b) by 164 days.

(21) Appl. No.: 13/652,540

(22) Filed: Oct. 16, 2012

(51) Int. Cl.
*H04M 1/00* (2006.01)

(52) U.S. Cl.
USPC .......... 455/575.8; 455/575.1; 455/556.1; 455/556.2; 455/557; 455/566; 348/333.01; 348/333.06; 348/333.07; 348/333.11

(58) Field of Classification Search
USPC ........... 455/556.1, 556.2, 557, 566, 575.1, 455/575.8, 90.1, 90.2, 90.3, 347, 349; 348/14.04, 14.07, 333.01, 333.02, 348/333.05, 333.06, 333.07, 333.11
See application file for complete search history.

(56) References Cited

U.S. PATENT DOCUMENTS

| 6,957,083 | B2 | 10/2005 | Ikeda et al. | |
| 7,420,615 | B2 * | 9/2008 | Tsai et al. | 348/373 |
| 7,557,851 | B2 * | 7/2009 | Ohashi et al. | 348/333.06 |
| 7,599,722 | B2 * | 10/2009 | Makishima | 455/575.3 |
| 7,626,630 | B2 * | 12/2009 | Nishino et al. | 348/333.06 |
| 7,835,775 | B2 * | 11/2010 | Sawayama et al. | 455/575.3 |
| 7,859,830 | B2 | 12/2010 | Morrison | |
| 8,188,655 | B2 | 5/2012 | Yamazaki | |
| 8,423,096 | B1 * | 4/2013 | Rao et al. | 455/575.1 |
| 8,509,612 | B1 * | 8/2013 | Pequeen | 396/544 |
| 2007/0152957 | A1 | 7/2007 | Shibata | |
| 2009/0016039 | A1 | 1/2009 | Imamura | |
| 2012/0206386 | A1 | 8/2012 | Xu et al. | |
| 2012/0270600 | A1 * | 10/2012 | Zelson | 455/556.1 |

\* cited by examiner

*Primary Examiner* — Tuan A Tran
(74) *Attorney, Agent, or Firm* — Jason L. Gilbert

(57) ABSTRACT

A passthrough case for a smart phone which provides a supplemental screen and controls for operating a camera of the smart phone. The passthrough case for a smart phone generally includes a cover for retaining a smart phone. The cover includes a phone receiving portion in which the smart phone is frictionally retained and which allows the display and controls of the smart phone to be fully accessible. A male connector extending from the cover interfaces with the data port of the smart phone to passthrough camera functionality to the cover. The user of the present invention may utilize a screen and controls on the cover to control camera functionality of the smart phone, thus significantly easing the process of taking self-portraits.

20 Claims, 5 Drawing Sheets

PASSTHROUGH CASE FOR A SMART PHONE

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a passthrough case and more specifically it relates to a passthrough case for a smart phone which provides a supplemental screen and controls for operating a camera of the smart phone.

2. Description of the Related Art

Any discussion of the related art throughout the specification should in no way be considered as an admission that such related art is widely known or forms part of common general knowledge in the field.

Smart phones are increasingly being used by the general population in place of traditional cellular phones. Smart phones generally provide improved functionality over traditionally cellular phones, such as allowing data transfer, internet access and the like. Cameras are almost universally included in smart phones currently being released.

With the inclusion of cameras in smart phones, consumers have more often been inclined to take self-portraits. However, the positioning of the camera lens on the back of the smart phone prevents such consumers from actually viewing the image which the camera is taking. Thus, the consumer is often required to take multiple pictures to obtain proper framing and lighting. Alternatively, consumers are required to take pictures of themselves in mirrors to frame a self-portrait properly.

Because of the inherent problems with the related art, there is a need for a new and improved passthrough case for a smart phone which provides a supplemental screen and controls for operating a camera of the smart phone.

BRIEF SUMMARY OF THE INVENTION

The invention generally relates to a passthrough case for a smart phone which includes a cover for retaining a smart phone. The cover includes a phone receiving portion in which the smart phone is frictionally retained and which allows the display and controls of the smart phone to be fully accessible. A male connector extending from the cover interfaces with the data port of the smart phone to passthrough camera functionality to the cover. The user of the present invention may utilize a screen and controls on the cover to control camera functionality of the smart phone, thus significantly easing the process of taking self-portraits.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
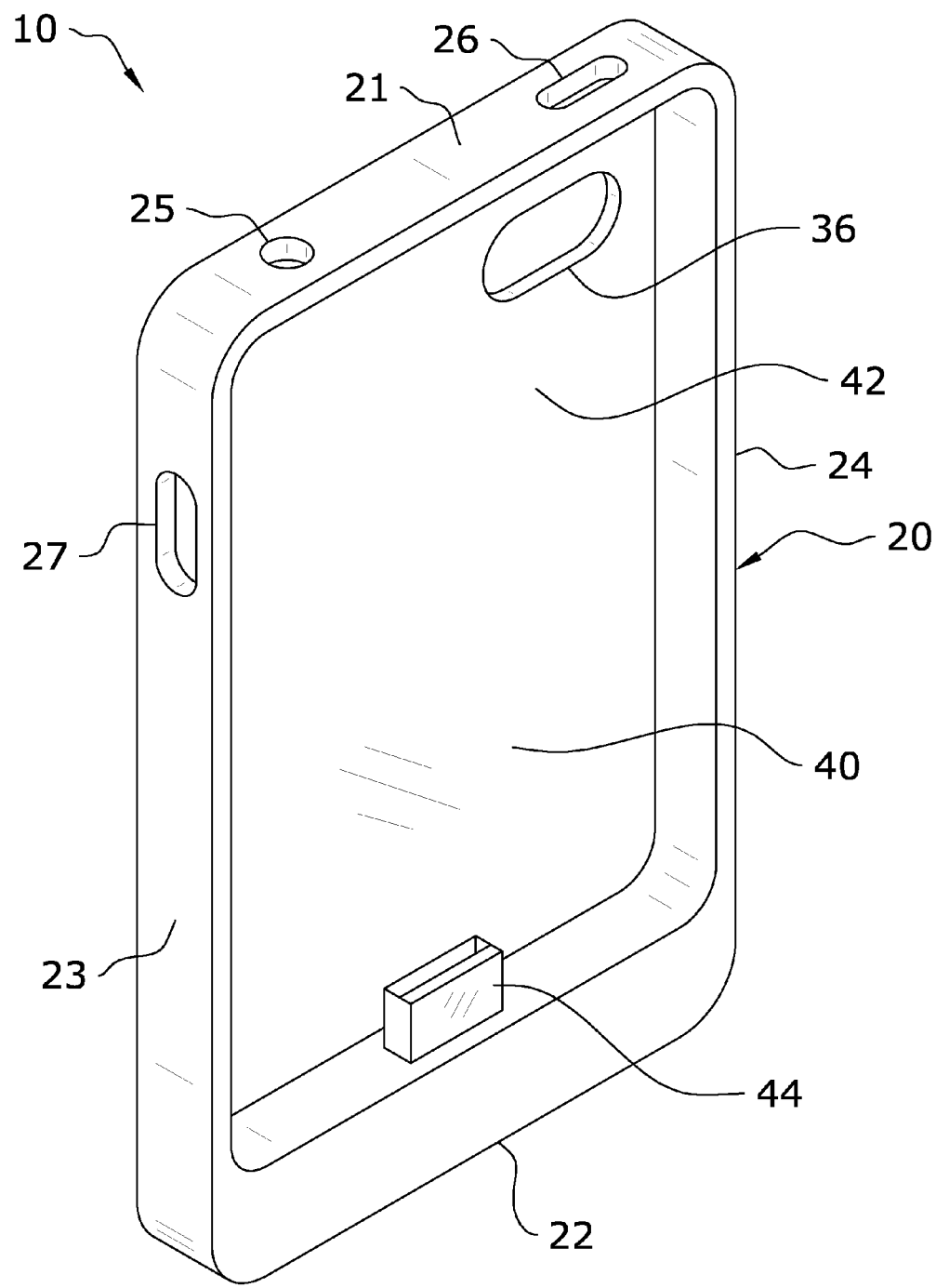
FIG. 1 is a frontal upper perspective view of the present invention.

Turning now descriptively to the drawings, in which similar reference characters denote similar elements throughout the several views, FIGS. 1 through 5 illustrate a passthrough case for a smart phone 10, which comprises a cover 20 for retaining a smart phone 12. The cover 20 includes a phone receiving portion 42 in which the smart phone 12 is frictionally retained and which allows the display 17 and controls 18 of the smart phone 12 to be fully accessible. A male connector 44 extending from the cover 20 interfaces with the data port 14 of the smart phone 12 to pass through camera functionality to the cover 20. The user of the present invention may utilize a screen 32 and controls 34 on the cover 20 to control camera functionality of the smart phone 12, thus significantly easing the process of taking self-portraits.

It is appreciated that the present invention is adapted for use with various types of smart phones 12. The typical smart phone 12 includes a data port 14, a lens/flash 16, a display 17 and one or more controls 18. It is appreciated that an exemplary smart phone 12 has been shown in the figures, but various shapes, sizes and configurations of smart phones 12 may be utilized with the present invention so long as the cover 20 is properly shaped and sized. Thus, the present invention should not be construed as being limited for use with any particular smart phone 12 model.

B. Cover

Figure 2:
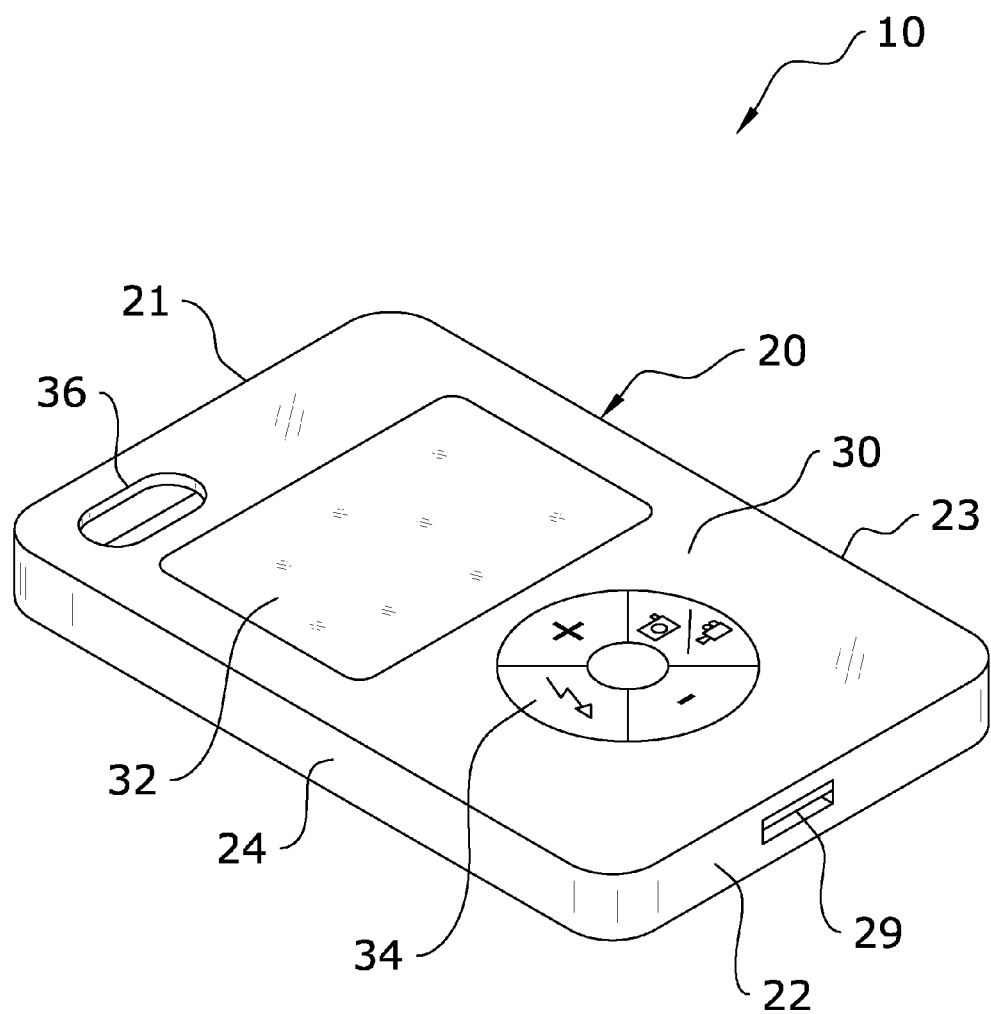
FIG. 2 is a rear upper perspective view of the present invention.

As shown in FIGS. 1 and 2, the present invention is generally comprised of a cover 20 which is adapted to removably receive a smart phone 12. The cover 20 may be comprised of various configurations to suit different types of smart phones 12. Thus, the specific exemplary configuration shown in the figures, including the size and shape of the cover 20, should not be construed as limiting the scope of the present invention.

Generally, the cover 20 will be comprised of a durable, plastic material, though it is appreciated other materials may be utilized. The cover 20 generally includes an upper end 21, a lower end 22, a first side 23 and a second side 24. A plurality of openings 25, 26, 27 are positioned along the case to allow access to certain vital components of the smart phone 12 when the cover 20 is installed thereon.

For example, in some embodiments, the upper end 21 may include an earphone opening 25 to allow access to the headphone jack of the smart phone 12. Similarly, the upper end 21 may also include a power switch opening 26 for providing access to the power switch of the smart phone 12. A volume control opening 27 may also be included on one of the sides 23, 24 of the cover 20 to allow access to volume controls of the smart phone 12.

The cover 20 will also generally include a data port 29 positioned at its lower end 22, or another location depending on the smart phone 12 utilized. The data port 29 is utilized to allow connection of a data transfer connector such as a USB cord 19 into the case 20 in a manner which passes through functionality to the data port 14 of the smart phone 12 so that the phone 12 may be charged or used for data transfer when the cover 20 is installed thereon.

The outer surface 30 of the cover 20, which covers the rear surface of the smart phone 12, is utilized to interface with the camera of the smart phone 12 when the present invention is in use. Thus, the outer surface 30 generally includes a screen 32 which will act as the viewfinder for the camera of the smart phone 12 when the present invention is in use. The screen 32 may be comprised of various sizes and configurations and may be positioned at various locations on the outer surface 30 of the cover 20. Preferably, the screen 32 will be comprised of an LED-display screen 32.

The outer surface 30 of the cover 20 also generally includes one or more controls 34 which are utilized to control operations of the camera of the smart phone 12 when the present invention is in use. The controls 34 may be comprised of buttons, touchscreen controls, knobs or any other structure capable of receiving commands. The controls 34 may be positioned at various locations on the case 20 and may be comprised of various configurations. In a preferred embodiment as shown in the figures, the controls 34 include a zoom in control, a zoom out control, a flash control and a photo/video selector.

The outer surface 30 of the cover 20 also includes a camera opening 36 which is positioned over the camera lens/flash 16 of the present invention. The camera opening 36 is preferably positioned on the cover 20 depending on the configuration of the particular smart phone 12 being used.

Figure 4:
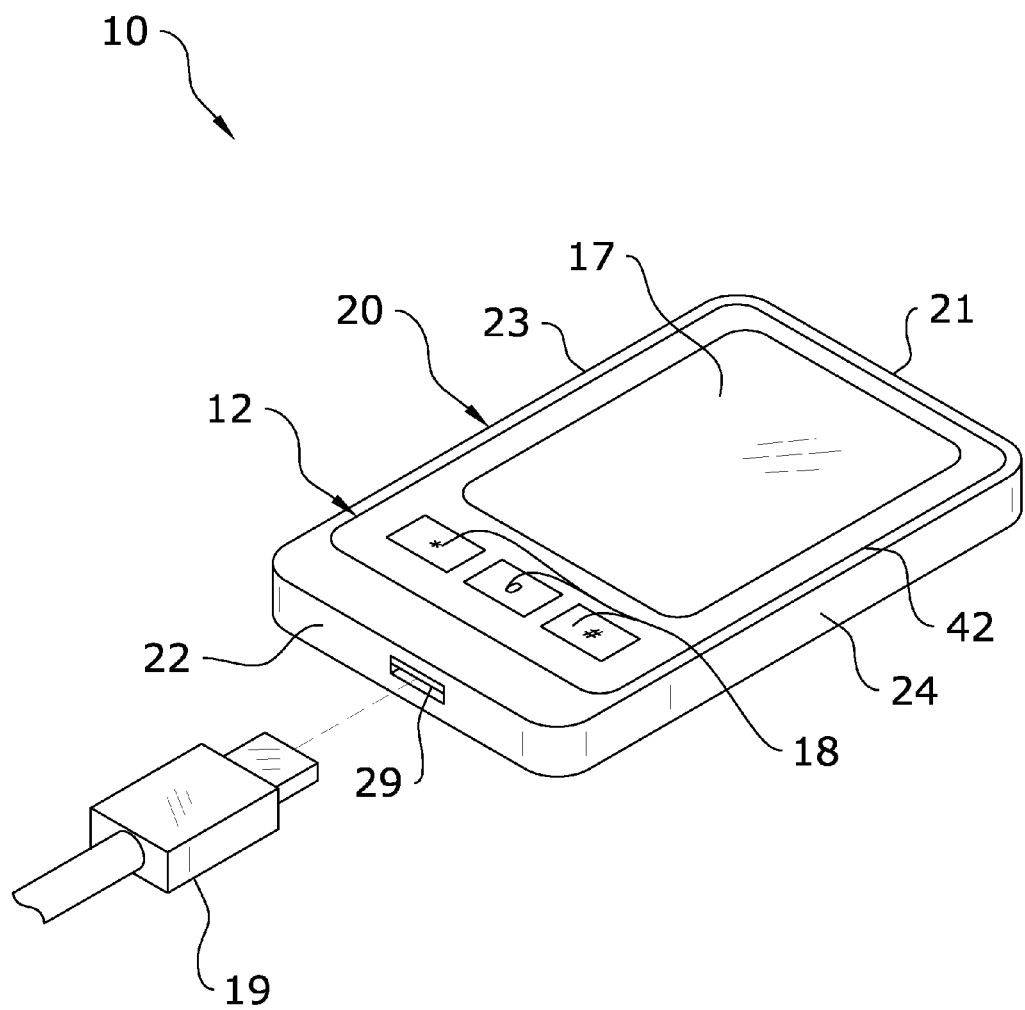
FIG. 4 is an upper perspective view of a smart phone positioned within the case of the present invention.
Figure 5:
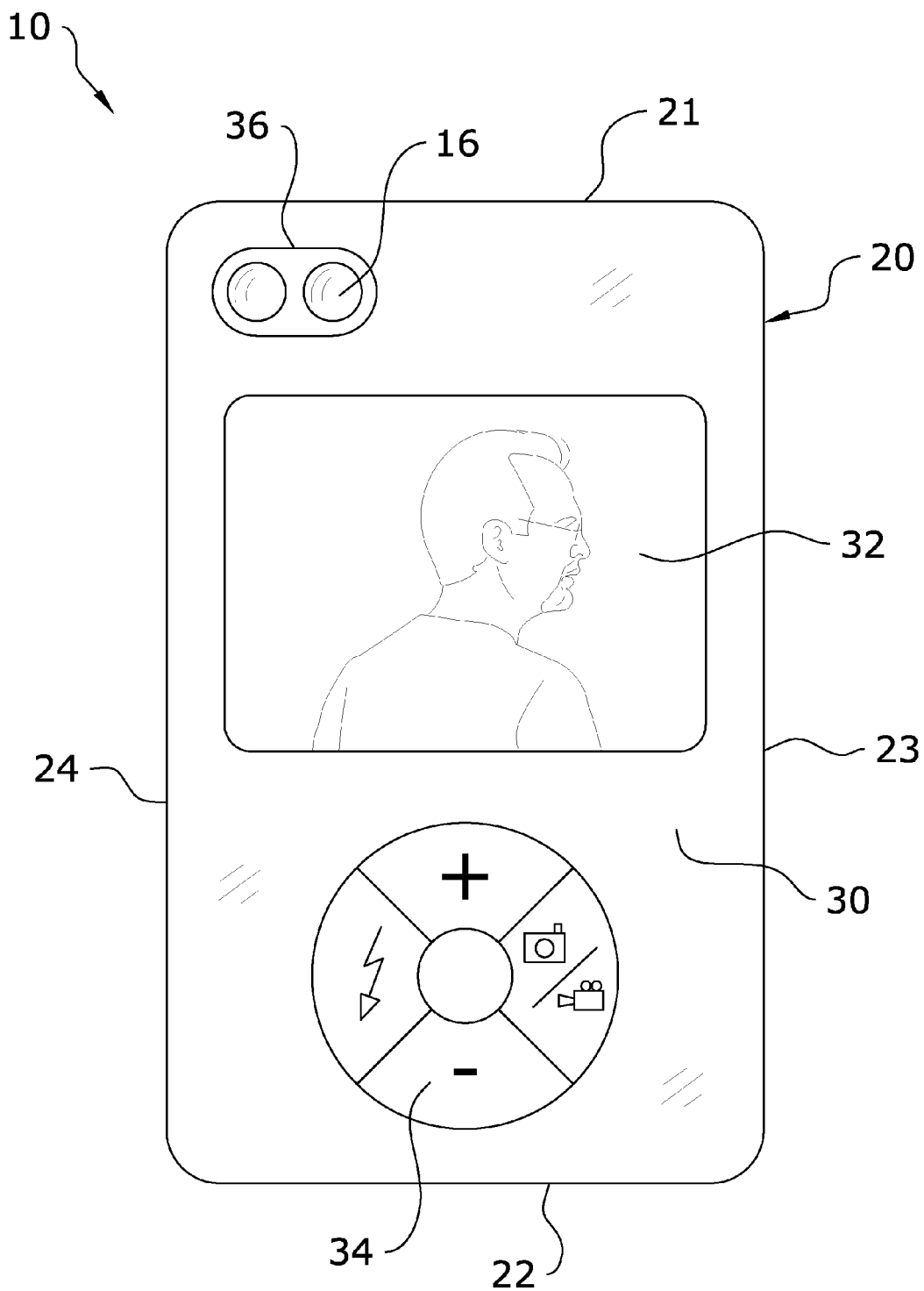
FIG. 5 is a rear view of the present invention in operation.

The inner surface 40 of the cover 20, acts to retain the smart phone 12 therein and allow viewing of the display 17 of the smart phone 12 when so installed, generally includes a phone receiving portion 42. The phone receiving portion 42 is comprised of a cut-out portion of the cover 20 in its inner surface 40 which creates four distinct inner sidewalls which frictionally engage with the outer sidewalls of the smart phone 12 when it is installed therein as shown in FIG. 4. The phone receiving portion 42 will preferably be of a size and shape which is suitable for firmly supporting the particular smart phone 12 being used therewith.

The inner surface 40 of the cover 20 also includes a male connector 44 extending from the cover 20 as shown in FIG. 1. The male connector 44 will engage with the data port 14 of the smart phone 12 and be utilized to passthrough data and displays from the smart phone 12 to the cover 20. The male connector 44 will also be communicatively interconnected with the data port 29 of the cover 20 to passthrough data and power when a plug 19 is installed in the cover 20.

C. Operation of Preferred Embodiment

Figure 3:
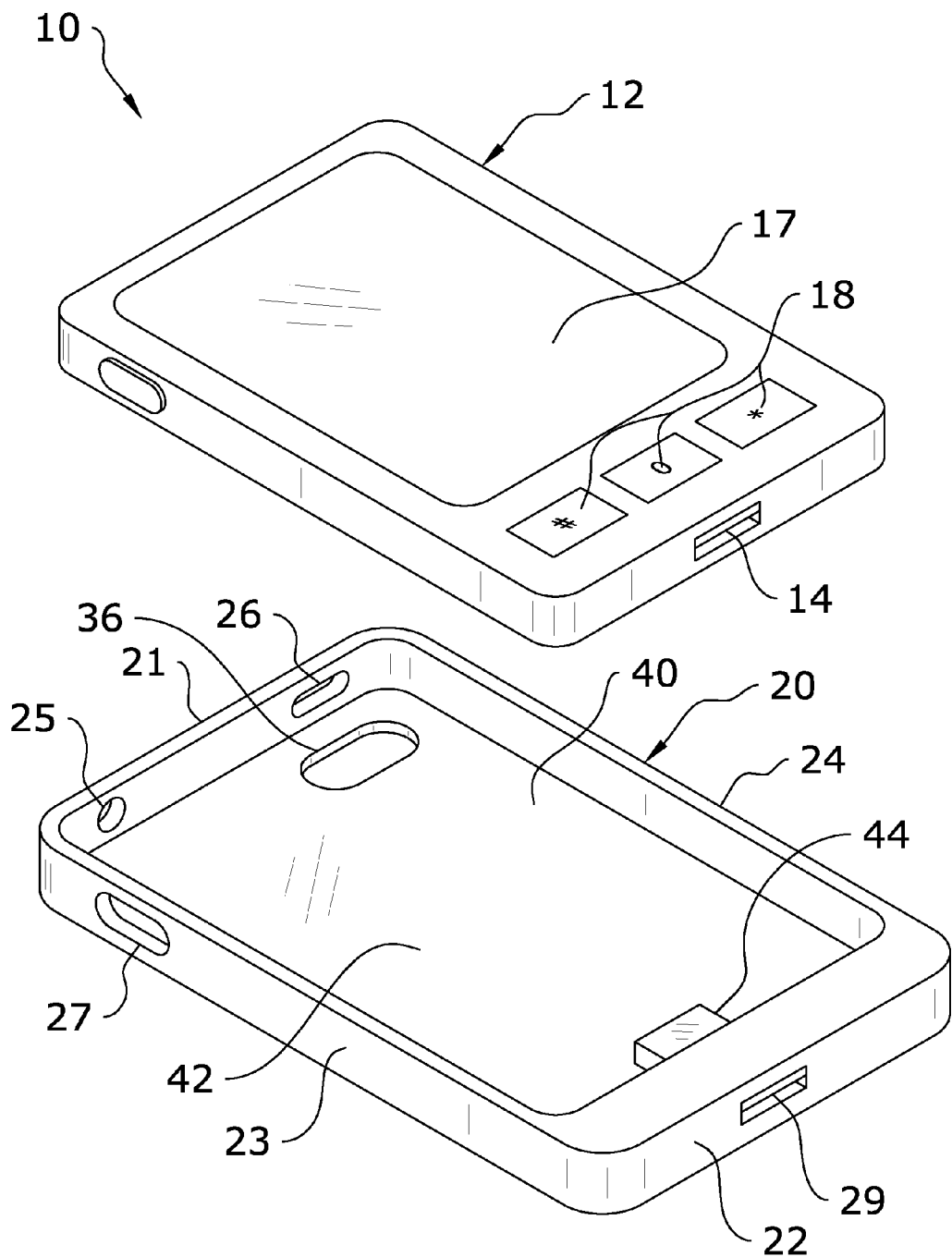
FIG. 3 is an upper perspective view illustrating positioning of a smart phone within the case of the present invention.

In use, the smart phone 12 is positioned within the phone receiving portion 42 of the cover 20 as shown in FIGS. 3 and 4. The male connector 44 of the cover 20 is positioned within the data port 14 of the smart phone 12 to allow passthrough functionality. The inner sidewalls of the inner surface 40 of the cover 20 will frictionally engage with the outer sidewalls of the smart phone 12 to ensure a tight fit. Access to various components of the smart phone 12 may be accessed through the various openings 25, 26, 27 on the cover 20.

When so installed, the smart phone 12 will function as normal. If the camera of the smart phone 12 is activated, the screen 32 of the cover 20 will display the viewfinder. The lens/flash 16 of the smart phone 12 will be unobstructed due to the use of the camera opening 36 on the outer surface 30 of the cover 20. The controls 34 on the cover 20 may be utilized to control the camera's functionality without directly contacting the smart phone 12. The present invention may thus be utilized to substantially improve self-taken pictures, as the subject of the picture has direct view of the viewfinder via the cover's 20 screen 32.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A passthrough case for a smart phone, comprising:
   a cover adapted to removably receive a smart phone, wherein said cover includes an outer surface and an inner surface;
   a male connector extending from said cover for engaging with a data port on said smart phone; and
   a screen positioned on said outer surface, wherein said screen is adapted to display a viewfinder of said smart phone.

2. The passthrough case for a smart phone of claim 1, wherein said screen is comprised of an LED screen.

3. The passthrough case for a smart phone of claim 1, wherein said cover includes an earphone opening, a power switch opening and a volume control opening.

4. The passthrough case for a smart phone of claim 1, wherein said cover includes a data port.

5. The passthrough case for a smart phone of claim 1, wherein said outer surface of said cover includes at least one control for controlling said smart phone.

6. The passthrough case for a smart phone of claim 5, wherein said at least one control is comprised of a camera zoom control.

7. The passthrough case for a smart phone of claim 5, wherein said at least one control is comprised of a flash control.

8. The passthrough case for a smart phone of claim 1, wherein said outer surface includes a camera opening for providing access to a lens of said smart phone.

9. The passthrough case for a smart phone of claim 1, wherein said inner surface includes a phone receiving portion adapted to frictionally retain said smart phone within said cover.

10. A passthrough case system, comprising:
   a smart phone, wherein said smart phone includes a camera lens;
   a cover adapted to removably receive said smart phone, wherein said cover includes an outer surface and an inner surface;
   a male connector extending from said cover for engaging with a data port on said smart phone; and
   a screen positioned on said outer surface, wherein said screen is adapted to display a viewfinder of said smart phone.

11. The passthrough case system of claim 10, wherein said screen is comprised of an LED screen.

12. The passthrough case system of claim 10, wherein said cover includes an earphone opening, a power switch opening and a volume control opening.

13. The passthrough case system of claim 10, wherein said cover includes a data port.

14. The passthrough case system of claim 10, wherein said outer surface of said cover includes at least one control for controlling said smart phone.

15. The passthrough case system of claim 14, wherein said at least one control is comprised of a camera zoom control.

16. The passthrough case system of claim 14, wherein said at least one control is comprised of a flash control.

17. The passthrough case system of claim 10, wherein said outer surface includes a camera opening for providing access to a lens of said smart phone.

18. The passthrough case system of claim 10, wherein said inner surface includes a phone receiving portion adapted to frictionally retain said smart phone within said cover.

19. A passthrough case for a smart phone, comprising:
   a cover adapted to removably receive a smart phone, wherein said cover includes an outer surface and an inner surface, wherein said cover includes an earphone opening, a power switch opening and a volume control opening, wherein said cover includes a data port, wherein said outer surface of said cover includes a plurality of controls for controlling said smart phone, wherein said outer surface includes a camera opening for providing access to a lens of said smart phone, wherein said inner surface includes a phone receiving portion adapted to frictionally retain said smart phone within said cover, wherein said plurality of controls includes a flash control;
   a male connector extending from said cover for engaging with a data port on said smart phone; and
   an LED screen positioned on said outer surface, wherein said screen is adapted to display a viewfinder of said smart phone.

20. The passthrough case system of claim 19, wherein said plurality of controls is further comprised of a camera zoom control.

* * * * *